Nov. 29, 1927.
C. H. HAPGOOD
1,651,272
BALANCING DEVICE
Filed June 23, 1923
6 Sheets-Sheet 1
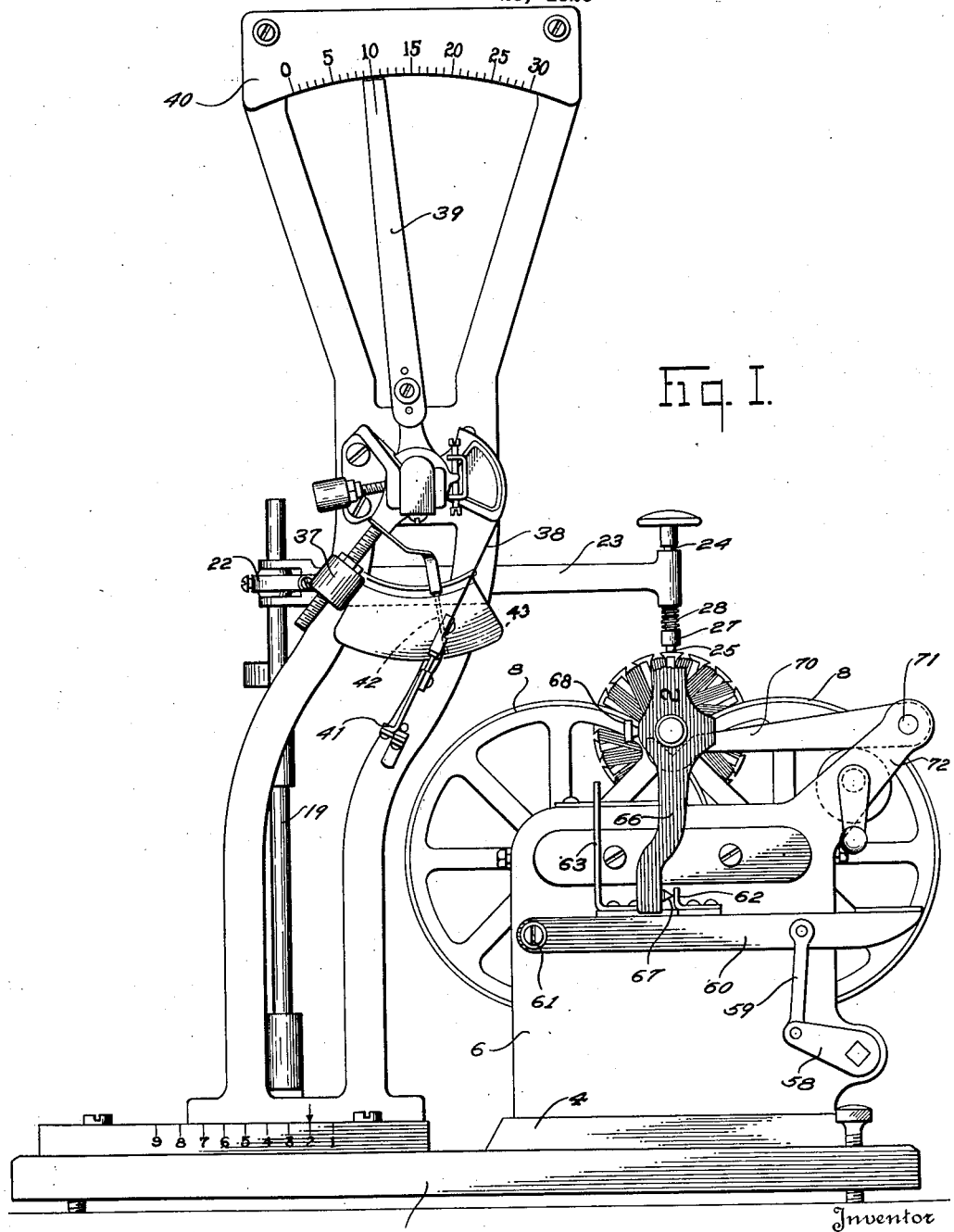
Fig. I.
Inventor
CLARENCE H. HAPGOOD.
By Marshall
Attorney

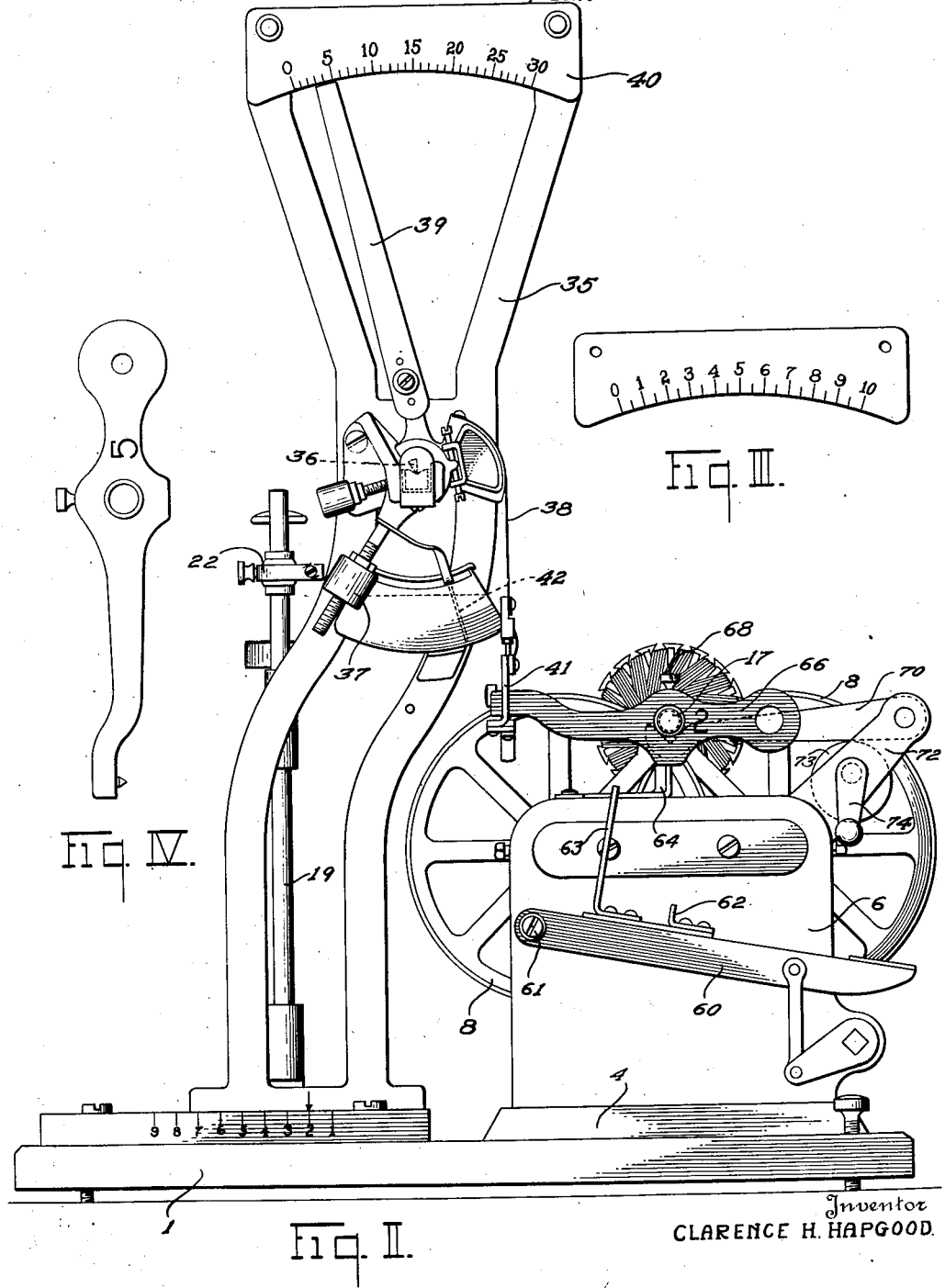

Nov. 29, 1927. 1,651,272
C. H. HAPGOOD
BALANCING DEVICE
Filed June 23, 1923 6 Sheets-Sheet 3
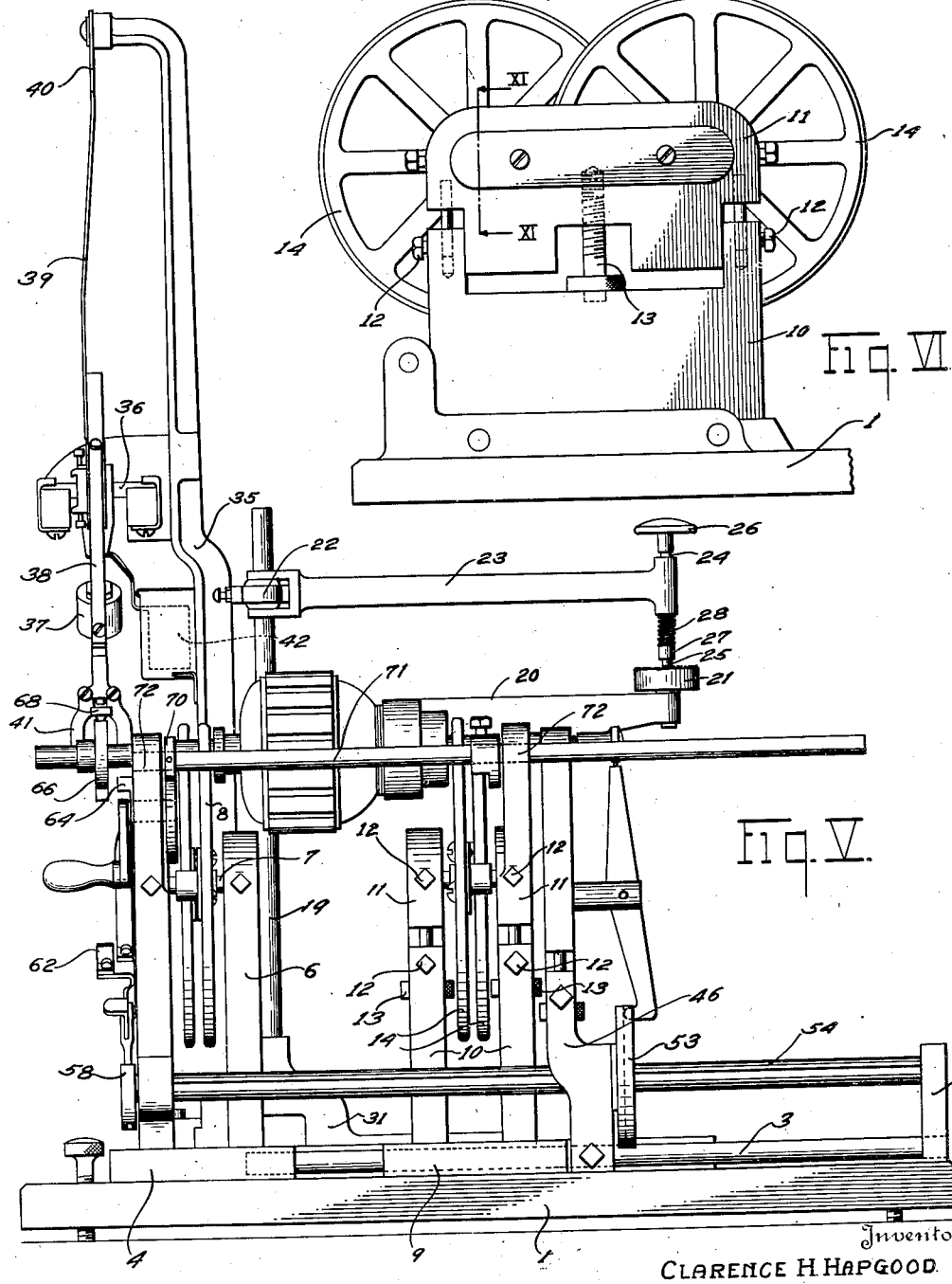
Inventor
CLARENCE H. HAPGOOD.
By CO Marshall
Attorney Nov. 29, 1927.
C. H. HAPGOOD
1,651,272
BALANCING DEVICE
Filed June 23, 1923    6 Sheets-Sheet 4
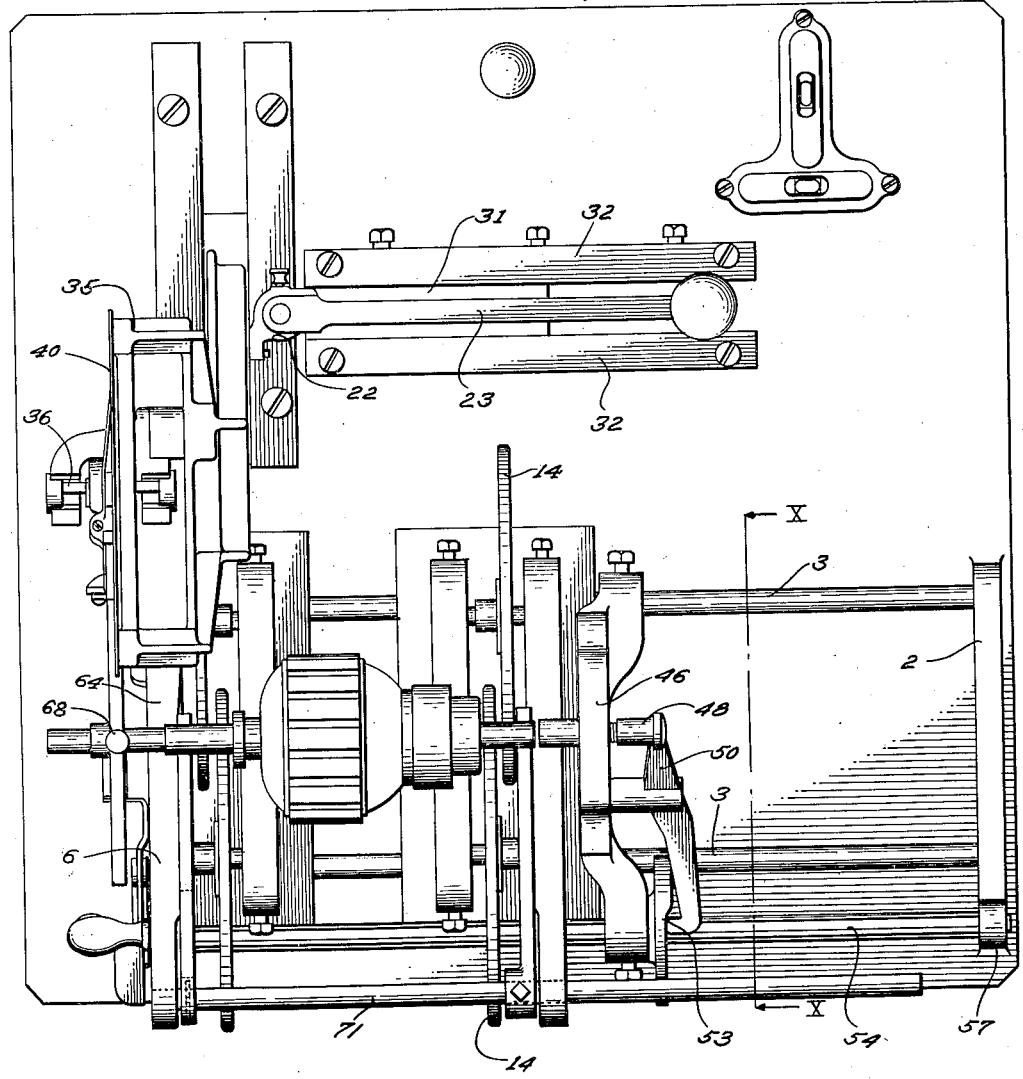
Fig. VII.
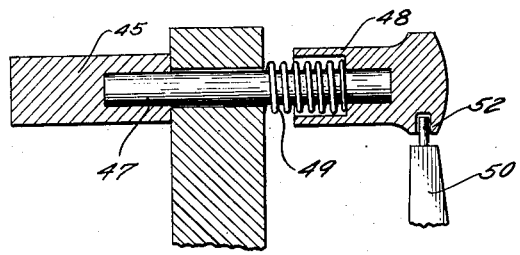
Fig. VIII.
Inventor
CLARENCE H. HAPGOOD.
By C. O. Marshall
Attorney

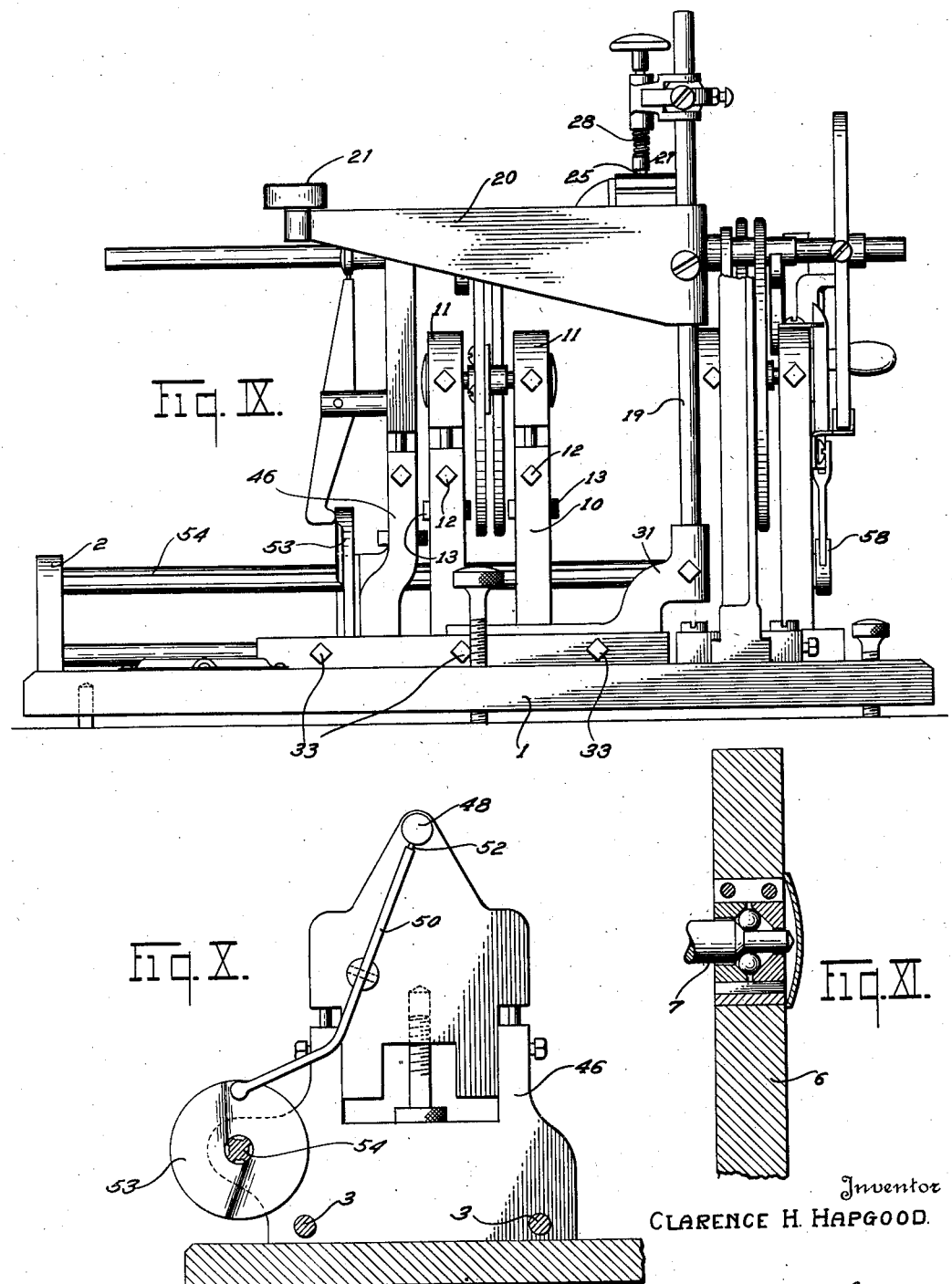

Nov. 29, 1927.
C. H. HAPGOOD
1,651,272
BALANCING DEVICE
Filed June 23, 1923    6 Sheets-Sheet 6
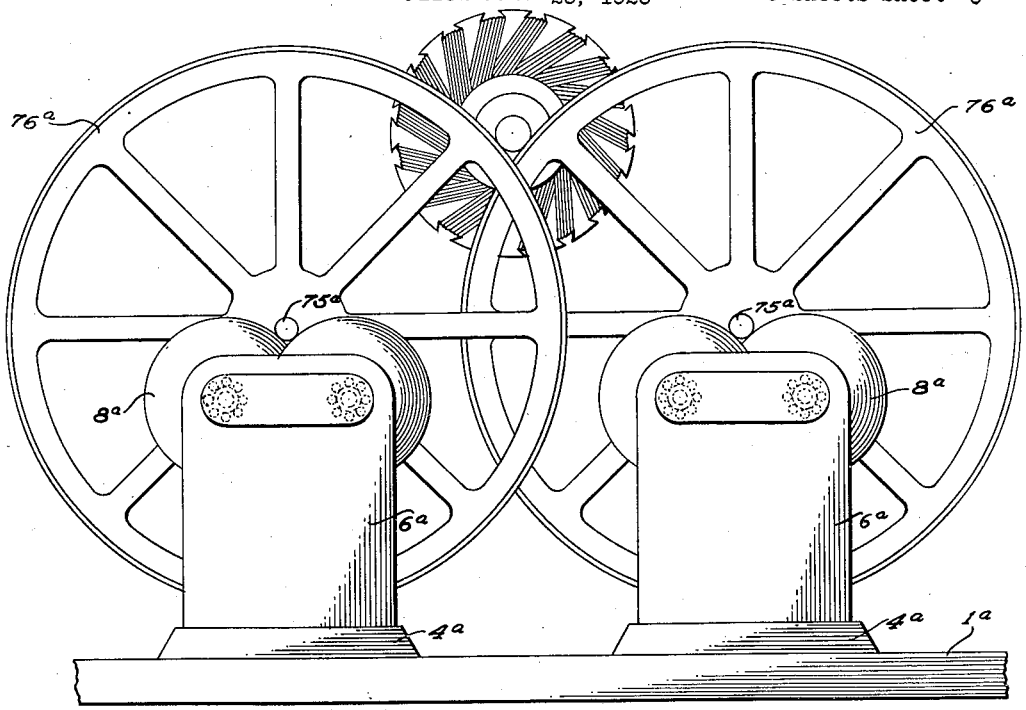
Fig. XIII.
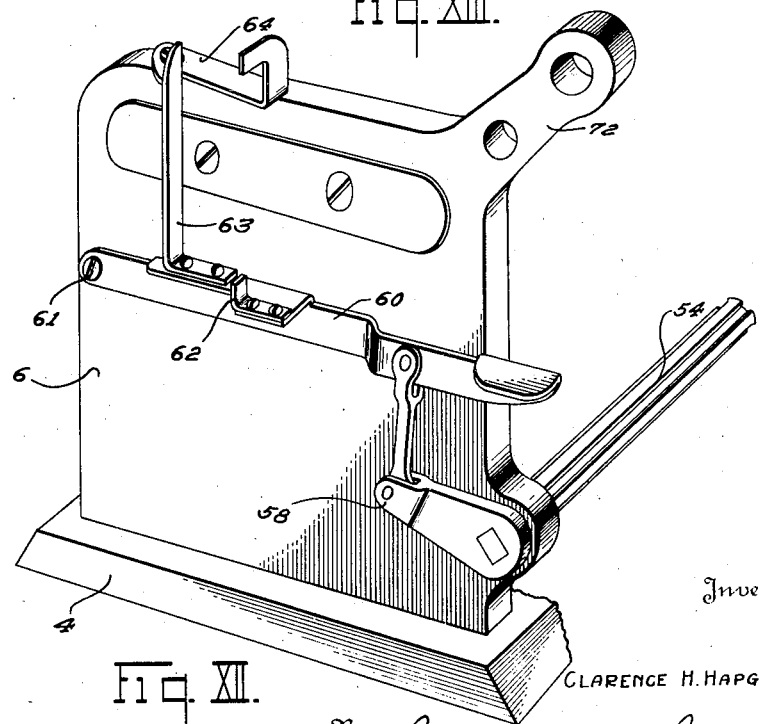
Fig. XII.
Inventor
CLARENCE H. HAPGOOD.
By C. M. Marshall
Attorney Patented Nov. 29, 1927.

1,651,272

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

BALANCING DEVICE.

Application filed June 23, 1923. Serial No. 647,231.

This invention relates to balancing devices, and particularly to devices employed in balancing motor armatures, fly wheels, fans and other rotatable members intended to turn at relatively high speeds.

One of the principal objects of my invention is to provide a balancing device having pairs of overlapping disks mounted upon antifriction bearings and adapted to support the shaft of the rotor to be balanced.

Another object of the invention is the provision of a balancing device having means for marking the "light point" (the point at which weight is to be added) or the "heavy point" (the point from which weight is to be taken) on the periphery of the rotor to be balanced.

Another object is the provision of a balancing device having means for automatically indicating the amount of weight that should be added to or removed from the part to be balanced.

Another object is the provision of a balancing device having means for positively indicating the quantity of weight necessary to be added to or taken from a rotor to be balanced and means for automatically indicating the amount of weight to be so added or taken.

Another object is to provide means for correctly positioning axially the rotor upon the bearing disks.

Another object is the provision of a device of the class described capable of balancing armatures and other devices of various sizes and shapes.

Another object is the provision of means for gently lowering the rotor shaft onto the bearing disks.

Still another object is the provision of a balancing device which is of simple and inexpensive construction and by the use of which rotors may be balanced with speed and accuracy by unskilled operatives.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a balancing device embodying my invention, showing an armature in one position thereon;

Figure II is a similar view with the armature in another position;

Figure III is a front elevational view of a chart for use with an armature of different weight;

Figure IV is an elevational view of a balanced lever for use with an armature of different diameter;

Figure V is a side elevational view of the device of my invention, with the parts in the positions in which they are shown in Figure II;

Figure VI is a fragmentary rear elevational view showing means for adjusting the height of the bearing disks;

Figure VII is a plan view of the device of my invention, with the parts in the positions in which they are shown in Figure II;

Figure VIII is an enlarged fragmentary sectional view showing a device for axially positioning a rotor shaft;

Figure IX is a side elevational view showing some of the parts of my device in the positions in which they are shown in Figure I;

Figure X is a fragmentary sectional view taken substantially on the line X—X of Figure VII;

Figure XI is an enlarged fragmentary sectional view showing one of the anti-friction bearings supporting the bearing disks;

Figure II is a fragmentary perspective view showing other positioning means; and Figure XIII is a fragmentary front elevational view showing a modified form of anti-friction bearing for supporting the rotor shaft.

The forms of my device which are illustrated in the drawings embody my invention as employed for balancing armatures of small motors, but it is to be understood that the invention is quite as applicable to devices for balancing the armatures of large motors as well as fly wheels, turbines and other rotors.

Referring to the drawings in detail, and particularly to Figures I, II, V and VII, which show the complete device, it will be seen that the mechanism is supported upon a substantially square base 1, at the rear right corner of which is an upturned flange 2 having apertures which snugly receive the ends of parallel forwardly-extending rods 3, the opposite ends of which are fixedly received in the rear edge of a horizontal plate 4, the plate 4 being secured to the base by means of machine screws 5.

The plate 4 supports a pair of parallel upstanding substantially rectangular flat members 6, in the upper ends of which are rotatably mounted by means of ball bearings the ends of shafts 7. The shafts 7 carry overlapping disk bearing members 8, which may, if preferred, be cut out into skeleton form as shown, for the sake of lightness.

The parallel rods 3 form ways upon which is slidably mounted a plate 9 which, like the plate 4, supports a pair of parallel upstanding members 10. The members 10 differ from the upstanding members 6 in that their upper ends 11 are vertically adjustable (see Figure VI). The ends 11 are firmly held in adjusted position by means of set screws 12. When the set screws 12 are loosened, the ends 11 may be moved upwardly or downwardly by means of an adjusting screw 13. Bearing disks 14, similar to the bearing disks 8, are mounted on ball bearings supported in the adjustable upper ends 11 of the members 10.

In order that the shaft of a rotor to be balanced may turn freely on the bearing, it is, of course, necessary that it be so located axially that no other part of the rotor be in contact with the bearing disks or with other parts of the balancing device. I have provided, therefore, means for properly locating the rotor shaft, which consists of a locating finger 45. The finger 45 is carried by a standard 46, which is in turn supported upon the parallel rods or ways 3, the upper end of the standard being vertically adjustable in the same way as are the upper ends of the bearing supporting members 10.

The locating finger 45 is secured to a plunger 47 which is slidably mounted in the upper end of the standard 46, the opposite end of the plunger being provided with a knob 48 which is counterbored to receive a coil spring 49 that serves to normally hold the locating finger 45 out of engagement with the end of the rotor shaft. The plunger 47 and locating finger 45 are operated by a rocker arm 50 which is pivoted on a suitable projection extending rearwardly from the standard 46 and is provided at its upper end with a pin 52 which is loosely received in an opening in the knob 48. The lower end of the rocker arm is engaged with a cam 53 which is slidably splined upon a fluted shaft 54, the shaft being journaled in bosses projecting from the edges of the flange 2 and the forward bearing supporting member 6. To the front end of the shaft 54 is fixed an arm 58 which is connected by means of a link 59 to an operating lever 60 which is pivoted, as at 61, to the forward bearing supporting member 6. Movement of the operating lever 60 from the position shown in Figure II to the position shown in Figure I partially rotates the fluted shaft 54 and the cam 53, thus rocking the rocker arm 50 and causing the locating finger 45 to push the rotor shaft into proper axial position. When the operating lever 60 is moved downwardly into the position in which it is shown in Figure II the locating finger 45 is disengaged from the armature shaft.

Since the plate 9 which carries the bearing supporting members 10 is slidably mounted on the ways 3, it may be moved to different positions in order that the device may be used for balancing rotors of different lengths, and since the standard 46 is independently adjustably mounted on the ways 3, it may be moved to the position in which the locating finger 45 will properly locate the rotor shaft, the cam 53 being, of course, moved along the fluted shaft 54 with the standard 46.

The ends of a rotor shaft are not always of the same diameter. The upper ends 11 of the bearing supporting members 10 are, therefore, made adjustable so that the bearing disks 14 may be elevated above or dropped to positions below the positions of the bearing disks 8, and, since the height of the center of the rotor shaft depends upon the diameter of the shaft, as well as upon the elevation of the bearing disks upon which the shaft rests, the upper end of the standard 46 is also made vertically adjustable.

When the shaft of a rotor to be balanced is supported upon the peripheries of the disks 8 and 14, it is free to rotate in either direction, and since a complete rotation of the shaft results in a relatively small angular movement of the disks, frictional resistance offered by the bearings to rotative movement of the shaft is very slight. The rotor will, therefore, if not perfectly balanced, swing to a position in which the "heavy point" on its periphery is lowermost and its "light point" is directly above the axis of the shaft upon which it is fixed.

It has become ordinary practice in balancing armatures of small motors to insert enough small pieces of metal in the grooves between the pole pieces of the core on the light side of the armature to bring the armature to a condition of balance. In order to balance an armature in this way, it is, of course, necessary that the operator know the point on the periphery at which the pieces of metal should be inserted.

For the purpose of indicating and marking such points, I have provided a marking device supported upon a post 19 which is supported by means of an adjustably mounted bracket 31 upon the base 1. Secured to and extending rearwardly from the post 19 is an arm 20, at the rearward end of which is supported and inking pad 21. Adjustably secured to the post 19 above the arm 20 is a collar 22 which vertically locates a horizontally swingable arm 23, one end of which is bifurcated and straddles the collar 22. In the other end of the swingable arm 23 is mounted a vertically-acting plunger 24, the lower end of which is provided with a suitable marking point 25, the upper end being provided with an operating knob 26. A coil spring 28 surrounding the plunger and compressed between the end of the arm 23 and a collar 27 fixed to the plunger serves to hold the marking point 25 pressed against the inking pad 21.

When an armature or other rotor supported by the bearing disks 8 and 14 has come to rest with its "light point" uppermost, the operator grasps the knob 26, withdraws the marking point 25 from the inking pad, and swings the plunger to a position directly above the axis of the rotor. He then allows the marking point 25 to be forced downwardly by the spring 28 into clamping engagement with the periphery of the armature. Engagement of the marking point with the periphery of the armature thus not only marks the point at which metal should be added to bring the armature to balance, but it clamps the armature in position with the "light point" uppermost.

The means for automatically determining and indicating the weight which should be added to bring the rotor into balanced condition is mounted upon a frame 35 adjustably supported at the left side of the forward part of the base 1.

Pivotally supported upon the frame 35 by means of a grooved bearing and knife edge pivot 36 is a load-counterbalancing pendulum 37 having an indicating hand 39 which cooperates with a suitable graduated chart 40. A paddle or vane 42 secured to the pendulum 37 is adapted to swing in a sector-like receptacle 43 containing oil, so that vibratory movements of the pendulum and the parts attached thereto are quickly dampened. While the "light point" on the armature is being located and marked in the manner hereinbefore set forth, the automatic load-counterbalancing and indicating mechanism is held in the position in which it is shown in Figure I by means of a flexible ribbon 38, the upper end of which is attached to a power sector on the pendulum, while its lower end is provided with a stirrup 41 that is temporarily removably secured to a pin or other projection on the frame 35.

For the purpose of connecting the rotor to the automatic load-counterbalancing mechanism, I provide a lever 66 having a cone pivot 67 at one end and an opening at its center adapted to receive the end of the armature shaft. The lever 66 is exactly balanced about the opening.

In order that the lever 66 may be secured to the armature shaft with its cone pivot 67 in a certain relation to the "light point" on the periphery of the rotor, I have provided a stop 62 on the operating lever 60. After the rotor has been clamped in position on the disk bearings by means of the marking point 25, the operating lever 60 is raised to the position in which it is shown in Figure I. With the lever in this position the stop 62 is directly below the axis of the rotor shaft.

The operating lever 60 is also provided with an upwardly-extending finger 63, which, when the operating lever 60 is raised to the position shown in Figure I, swings a positioning member 64 outwardly. With the parts in this position it is only necessary to slip the lever 66 inwardly upon the rotor shaft until it engages the positioning member 64 with its cone pivot in engagement with the stop 62 and secure it in place upon the rotor shaft by means of the set screw 68. The marker point 25 is then lifted from its clamping engagement with the rotor and replaced upon the inking pad. The rotor is thus again free to turn on the disk bearings. The operating lever 60 is depressed to the position shown in Figure II, so that the stop 62 and positioning member 64 are moved out of engagement with the lever 66 and the locating finger 45 is moved out of engagement with the opposite end of the rotor shaft and the cone pivot 67 of the lever 66 is placed in the stirrup 41 (see Figure II). Since the "heavy point" of the rotor lies in a plane passing through the axis of the shaft and the cone pivot 67, the unbalanced condition of the rotor will cause the pendulum 37 to swing upwardly until the parts come to a condition of balance. The chart 40 is so calibrated that with the rotor and pendulum in a condition of balance the indicating hand will indicate on the chart the number of strips of metal that should be placed in the groove between the pole pieces of the rotor. It is then only necessary to place the number of pieces indicated in the groove previously marked by the marking point 25.

The amount of weight necessary to balance an armature or other rotatable member depends, of course, upon the distance from the axis of rotation of the point at which the weight is added, and in motor armatures the distance of this point from the axis depends upon the size of the armature. In order to adapt the device of my invention for use in balancing armatures of different sizes, I have provided the device with a plurality of interchangeable levers of different lengths, such as is illustrated in Figure IV. Use of a lever longer than that with which the device is shown as equipped in Figure II, of course, requires that the distance between the frame supporting the armature and the frame supporting the automatic load-counterbalancing and indicating mechanism be increased. Such increase in distance is provided for by the adjustable mounting of the frame 35, and, if desired, the position in which the frame should be placed to provide for the use of any particular lever may be marked, as shown in Figure II, with figures corresponding to figures marked upon the levers.

I have also provided the device with interchangeable charts to be used with pieces of balancing metal of different weights.

In cases in which it is desired to balance the device by removing metal from the "heavy point", the chart may be graduated to indicate the depth of a hole of certain diameter to be bored in the periphery of the rotor.

In order to provide for lowering the shaft of the armature gently onto the bearing disks and thus avoid marring their peripheries, I have equipped my device with a pair of pivoted arms 70 which are fixed to a shaft 71 journaled in extensions 72 on one of the members 6 and one of the members 10. The ends of the arms 70 are provided with notches to receive the rotor shaft and one of the arms 70 is angularly adjustable upon the shaft 71 so that it may be elevated or lowered in case both ends of the rotor shaft are not of the same diameter. A cam 73 rotatably supported on the forward extension 72 underlies the forward arm 70 and is provided with a crank 74 by means of which it may be turned to elevate the arms. With the arms in elevated position the rotor shaft is placed in the notches at their ends and is then lowered gently onto the bearing disks by turning the cam 73 to the position shown in Figure II.

In Figure XIII I have shown a modification of the device in which friction is still further reduced. In this modification the base 1ª supports plates 4ª and upright members 6ª upon which are supported two sets of overlapping bearing disks 8ª, and resting upon the bearing disks 8ª are shafts 75ª of overlapping wheels 76ª, upon the peripheries of which rests the shaft of the rotor to be balanced. The friction generated in a journal bearing is nearly proportional to the angular movement of the shaft in the bearing, and, since rotation of the rotor causes very slight angular movement of the wheels 76ª and angular movement of the wheels 76ª causes still less angular movement of the disks 8ª, the movement of the shafts supporting the disks 8ª in their bearings is very slight indeed. If the peripheries of the disks 8ª and the wheels 76ª are true circles, truly concentric to the axis of their shafts, there is substantially no resistance to the rolling movement of the shafts 75ª on the disks 8ª or of the rotor shaft on the wheels 76ª. In this form of my device the wheels 76ª may be readily removed for grinding should their peripheries become nicked or marred.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, anti-friction bearings for supporting a rotor shaft, means for marking upon a rotor the point where material should be added or subtracted to balance the rotor, automatic means for indicating the quantity of material to be so added or subtracted, and means for connecting the rotor to said automatic indicating means.

2. In a device of the class described, in combination, anti-friction bearings adapted to support a rotor to be balanced, means for marking upon said rotor the point adjacent which material should be added to balance said rotor, automatic load-counterbalancing and indicating mechanism, a lever adapted to be attached to said rotor, and means for connecting said lever to said automatic load-counterbalancing and indicating mechanism.

3. In a device of the class described, in combination, anti-friction bearings adapted to support a rotor to be balanced, means for clamping said rotor in a position of equilibrium, a lever adapted to be fixedly secured to said rotor, means for positioning said lever with respect to the out-of-balance condition of said rotor, load-counterbalancing and indicating mechanism, and means for connecting said lever to said load-counterbalancing and indicating mechanism.

4. In a device of the class described, in combination, anti-friction bearings adapted to support a rotor to be balanced, means for clamping said rotor in a position of equilibrium, a lever adapted to be fixedly secured to said rotor, means for positioning said lever with respect to the out-of-balance condition of said rotor, automatic load-counterbalancing and indicating mechanism, and means for connecting said lever to said automatic load-counterbalancing and indicating mechanism.

5. In a device of the class described, in combination, anti-friction bearings adapted to support a rotor to be balanced, means for clamping said rotor in a position of equilibrium and simultaneously marking said rotor adjacent the point where weight should be added or subtracted to balance said rotor, means for automatically indicating the amount of weight to be so added or subtracted, and means for connecting said rotor to said automatic indicating mechanism.

6. In a device of the class described, in combination, antifriction bearings adapted to support a rotor to be balanced, means for clamping such rotor in a position of equilibrium and marking thereon the point adjacent which weight should be added to bring said rotor to balance, a lever adapted to be secured to such rotor, means for positioning said lever in respect of the out-of-balance condition of such rotor, means for automatically indicating the quantity of weight necessary to bring said rotor to balance, and means for connecting said lever to said automatic indicating mechanism.

7. In a device of the class described, in combination, antifriction bearings adapted to support a rotor to be balanced, a plunger, and means for locating said spring-pressed plunger above the axis of said rotor whereby said plunger when released will clamp said rotor in a position of equilibrium.

8. In a device of the class described, in combination, antifriction bearings adapted to support a rotor to be balanced, a plunger, means for locating said spring-pressed plunger above the axis of said rotor whereby said plunger when released will clamp said rotor in a position of equilibrium, and a marker carried by said spring-pressed plunger and adapted to mark the "light point" of said rotor.

9. In a device of the class described, in combination, antifriction bearings adapted to support a rotor, a swingable arm adapted to be secured to a position in which one end is above the axis of said rotor, and a spring-pressed plunger carried by said arm and adapted to engage said rotor.

10. In a device of the class described, in combination, antifriction bearings adapted to support a rotor, a swingable arm adapted to be secured to a position in which one end is above the axis of said rotor, and a marker carried by said arm and adapted to engage said rotor.

11. In a device of the class described, in combination, a pair of overlapping bearing disks, a second pair of overlapping bearing disks, means whereby the height of one of said pairs of bearing disks may be adjusted, means adjustably supporting said pairs of bearing disks whereby the distance of one pair from the other may be varied, automatic load-counter balancing and indicating mechanism, means supporting said automatic load-counterbalancing and indicating mechanism, and means for adjusting the distance of said automatic load-counterbalancing and indicating mechanism supporting means from said disk supporting means.

12. In a device of the class described, in combination, pairs of overlapping bearing disks adapted to support a rotor shaft, and means for gently lowering said rotor shaft upon said bearing disks, said means consisting of notched members adapted to receive said rotor shaft, and means for slowly lowering said notched members.

13. In a device of the class described, in combination, means for supporting a rotor to be balanced, means for automatically indicating the amount of weight that should be added to or subtracted from said rotor, and a plurality of charts adapted for selective use in said automatic indicating mechanism to adapt the same for use in balancing rotors of different types.

14. In a device of the class described, in combination, means for supporting a rotor to be balanced, means for automatically indicating the quantity of material which should be added or subtracted to bring a rotor to balance, the relative positions of said supporting and indicating means being adjustable, and a plurality of levers adapted for selective use in connecting rotors to said automatic indicating means for adapting the device for use in balancing rotors of different types.

15. In a device of the class described, in combination, a support for a rotor to be balanced, automatic means for indicating the amount of material necessary to be added or subtracted to balance such rotor, means for connecting said rotor to said automatic indicating mechanism, and means for attaching said connecting means to said rotor in positions determined by the out-of-balance conditions of particular rotors.

16. In a device of the class described, in combination, a support for a rotor arranged to allow the heavy side of said rotor to turn to the bottom so that its location may be determined, automatic means for indicating the amount of material that should be added to such rotor to bring it to balance, and means for connecting said rotor to said automatic indicating mechanism with the "heavy point" of said rotor in approximately the same horizontal plane as the axis of said rotor.

CLARENCE H. HAPGOOD.